Sept. 12, 1967    M. P. PRATER    3,341,276

RANDOM ACCESS MOTION PICTURE FILM

Filed Dec. 17, 1964    3 Sheets-Sheet 1

INVENTOR
MERLE P. PRATER

BY *Donald R. Campbell*
ATTORNEY

Sept. 12, 1967   M. P. PRATER   3,341,276
RANDOM ACCESS MOTION PICTURE FILM
Filed Dec. 17, 1964   3 Sheets-Sheet 2

Sept. 12, 1967  M. P. PRATER  3,341,276
RANDOM ACCESS MOTION PICTURE FILM
Filed Dec. 17, 1964  3 Sheets-Sheet 3
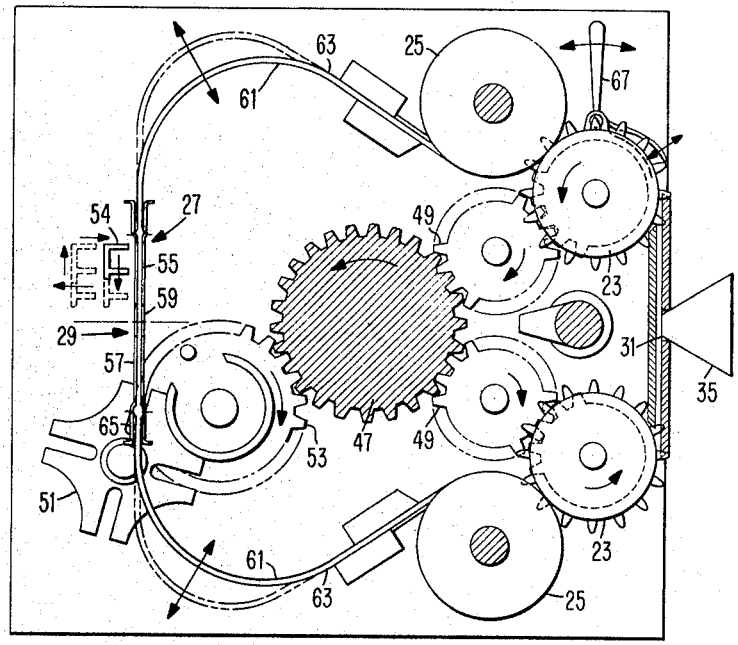
FIG. 5
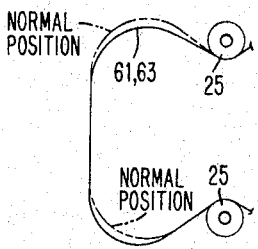
FIG. 8a
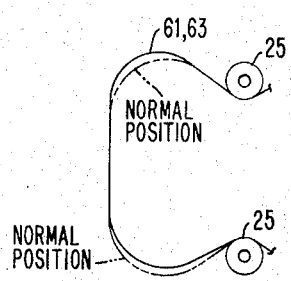
FIG. 8b
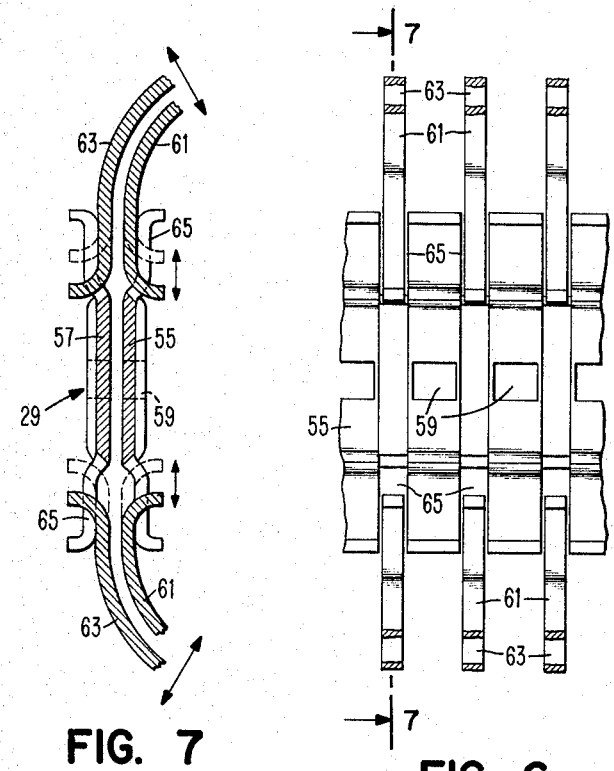
FIG. 7
FIG. 6

United States Patent Office 3,341,276
Patented Sept. 12, 1967

3,341,276
RANDOM ACCESS MOTION PICTURE FILM
Merle P. Prater, Vestal, N.Y., assignor to International Business Machines Corporation, New York, N.Y., a corporation of New York
Filed Dec. 17, 1964, Ser. No. 418,996
1 Claim. (Cl. 352—37)

This invention relates to random access motion picture film, and more particularly to a parallel-serial film format having associated recording tracks. Such a format is useful for instance as an instructional device or as the basic storage unit of an information storage and retrieval system.

An object of the invention is to provide a new and improved multi-channel motion picture film with accompanying sound recording tracks, the film being arranged to be shown in its entirety, in selected segments either once or repetitively, or as still pictures.

Another object is the provision of a generally improved and more satisfactory film of the foregoing type capable of being stored flat while being moved through a projector as a continuous belt.

Yet another object is to provide a new and improved random access instructional (or teaching machine) motion picture film strip having space for both pre-recorded information and information to be recorded by the student, teacher, or worker.

A further object is to provide a new and improved multi-channel film storage medium for an information storage and retrieval system.

The foregoing and other objects, features and advantages of the invention will be apparent from the following more particular description of preferred embodiments of the invention, as illustrated in the accompanying drawings wherein:

FIG. 5 is an enlarged schematic cross-section of the projector itself;

FIG. 6 is a schematic front view of the film gate shown in FIG. 5;

FIG. 7 is a cross-section view taken on line 7—7 of FIG. 6; and

FIGS. 8a and b are diagrammatic end views illustrating the operation of a portion of the projector.

Figure 1:
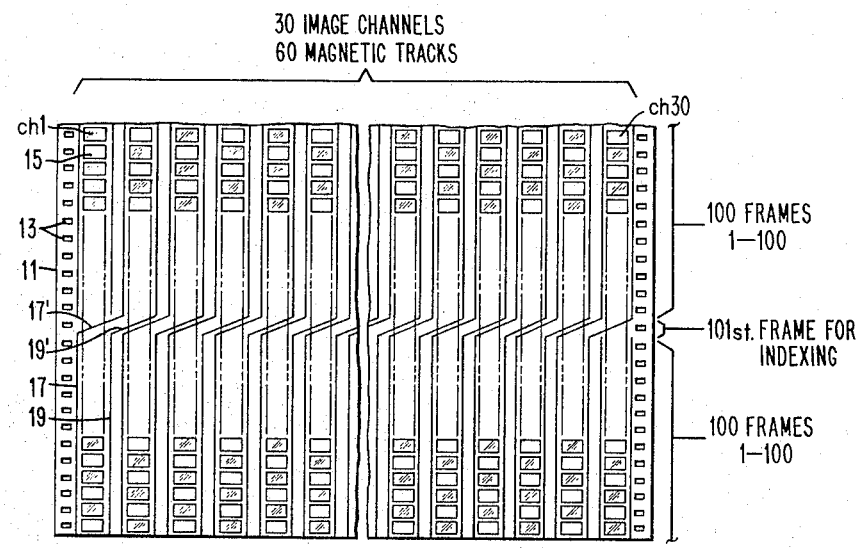
FIG. 1 is a fragmentary schematic plan view of the motion picture film according to the invention shown in its flat filing condition.

The motion picture format shown in FIG. 1 comprises a great number of individual equal-sized frames arranged in parallel channels and aligned rows. The film unit 11 lies flat for filing purposes and has sprocket holes 13 along either side. In a preferred example, the film unit 11 is about 10 inches by 15 inches in size and the frames 15 are an 8 mm. size. For these dimensions, the film unit 11 conveniently accommodates 30 channels of 100 frames per channel with space for an additional 101st frame position to be used for recording track continuity. Each channel of frames has at least one sound recording track associated with it extending parallel to the channels. In the example, two tracks 17 and 19 are associated with each of the channels, there preferably being one track at either side of the frame. If shown at the normal sound rate of 24 frames per second, the capacity of a 10 by 15 inch film sheet with 8 mm. frame size would last a little over two minutes on the screen. Larger or smaller frame sizes can be used, of course, and reduce or increase the duration of the film unit by corresponding amounts.

Figure 2:
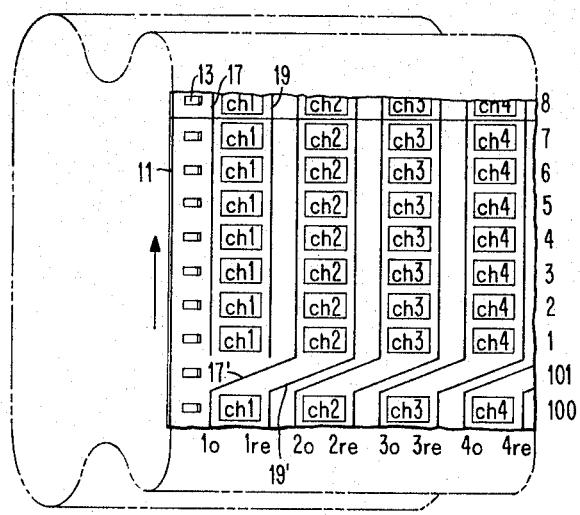
FIG. 2 is a fragmentary schematic perspective view of the motion picture film of FIG. 1 rolled into a continuous belt as in its position of use in a projector.

The motion picture film unit or strip 11 can be shown (1) in its entirety, (2) in selected segments, or (3) as still pictures. In addition, the selected segments can be shown repetitively as many times as desirable, immediately and without scanning. To accomplish this, the film strip 11 moves through the projector as a continuous endless belt as illustrated in FIG. 2. In this view the arrangement of the individual picture frames in channels and the two sound recording tracks 17 and 19 associated with each of the channels can be seen more plainly. Although both tracks are preferably magnetic tracks, it is possible for at least one track to be an optical recording track. The 101st frame space contains diagonal crossover sound tracks 17′ and 19′ which connect the film tracks next to frame 100 of a particular channel with the sound tracks associated with frame 1 of the next channel. There is no picture frame in the 101st frame space to allow for indexing the film strip 11 in the direction of its width from one channel to another channel. When playing the film strip through from one end continuously to the other end, each of the channels is viewed in sequence starting with frame 1 of each of the channels. If the magnetic recording tracks are used for sound recording, the diagonal connecting sound tracks 17′ and 19′ provide for continuous sound during the indexing, and when the film strip is shown at normal speeds, there is substantially no discontinuity in the visual picture that is seen by the observer.

It is readily seen that controls can be provided on the projector machine for indexing the film strip 11 to the start of any desired particular channel for showing a selected segment of the film strip, and that the selected segment may be shown repetitively as many times as is needed. Controls may also be provided on the projector machine for stopping the film strip at any selected frame of a particular channel, for showing as a still picture. In addition, a talking slide can be made by photographing the same picture repetitively. The arrangement of the picture frames 15 in channels and in parallel rows in conjunction with its being projected as an endless belt provides for flexibility in the viewing of the film strip due to the random access capabilities of each channel provided by this format.

For use in giving instruction in a step-by-step method of training, each film strip 11 desirably relates to a "single concept" or a unit of instruction showing one experiment, action or demonstration, or teaching one point or a short series of related points. The use of the two magnetic sound recording tracks 17 and 19 (or one optical track and one magnetic track) associated with each of the channels is especially useful when the film strip 11 is used as a teaching machine device. In this case one channel desirably contains original pre-recorded information while the second channel can be reserved for recording on the spot by the student. In FIG. 2, the original pre-recorded tracks are identified as 1o, 2o, etc., and the student record-erase tracks are identified as 1re, 2re, etc. The second track can be used, for instance, for recording student answers or for repeating the recorded information, such as during language instruction, or for describing the pictures seen visually. Certain student learning programs may make it desirable for the teacher to override or add to the original sound track. In this manner of usage of the magnetic tracks, it would be necessary to provide a mechanism on the projector machine so that the volume of the original can be diminished while the superimposed signal is active.

In the use of the film strip 11 as the storage medium unit of an information storage and retrieval system, the magnetic tracks 17 and 19 associated with each of the channels would be used to provide signals for locating and selecting a particular picture frame. One of the magnetic tracks per channel may be sufficient for this purpose. The flat form of the film strip is obviously desirable for this use, since filing in the flat form is desirable over filing as a belt. In addition, it is much cheaper and more convenient to reproduce a flat positive master print, and quick and inexpensive prints can be made on the various copy films available today.

Another use of this motion picture format is in systems that distribute short motion picture films to a network of display devices, such as in the form of large television screens in school or classrooms, or to industrial work locations where intermittent or infrequently used instructions are needed. The projector machines in these applications are located in a central location where the film image can be scanned by a television camera for distribution to the screens calling for a particular motion picture or slide sequence. With film transport and self-threading devices it is possible to randomly select any film in a file, show scenes as required and return it to the file.

Figure 4:
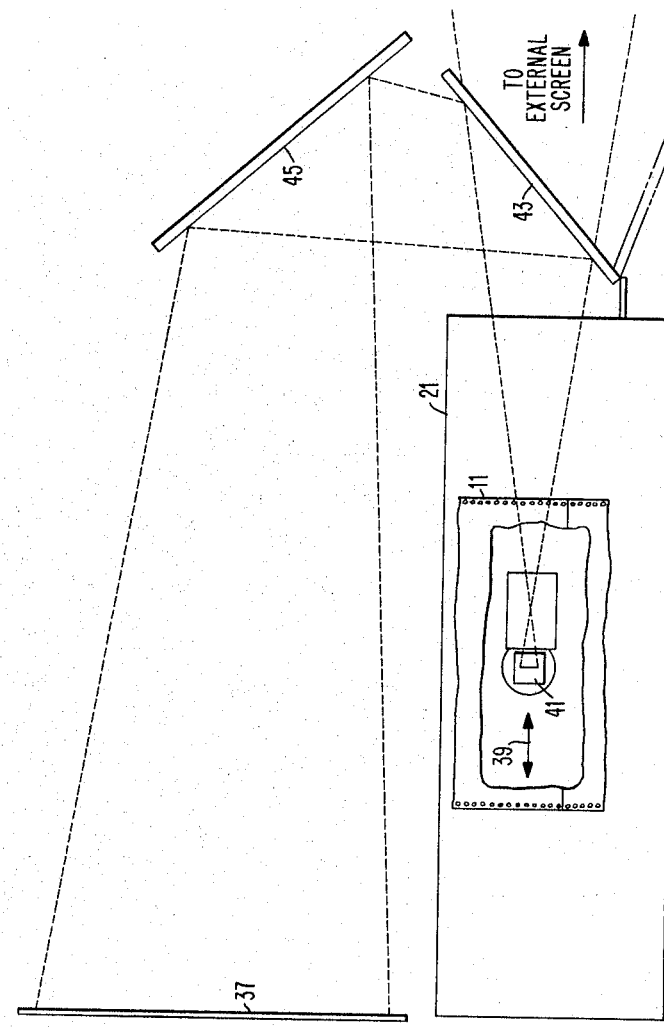
FIGS. 3 and 4 are schematic end and front views, respectively, of the basic features of a projector system for showing the film format according to the invention.
Figure 3:
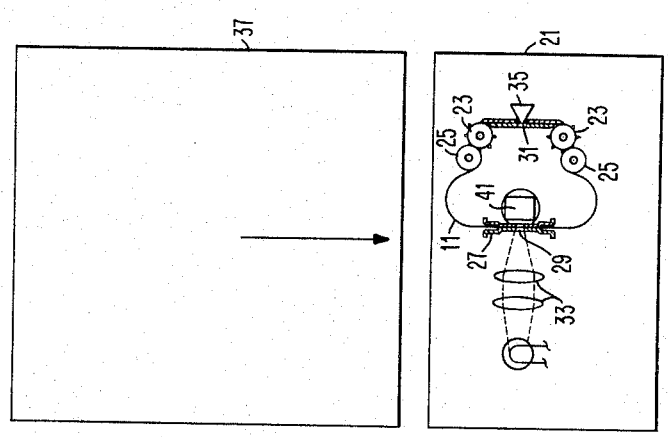

The basic features of a projector machine for showing the motion picture film strip 11 having the format according to the invention will be reviewed in order to demonstrate the feasibility of the entire system and to improve upon the understanding of the nature and advantages of the format. Referring to FIGS. 3 and 4, the projector machine 21 comprises a pair of drive sprockets 23, a pair of idlers 25, and a film guide mechanism 27 providing for movement of a film strip 11 as an endless belt past a film gate 29 and a separate sound gate 31. Projection optics 33 is provided for illuminating the picture frames 15 as they pass through the film gate 29, and a sound head 35 is located at the sound gate 31 for detecting the information on magnetic tracks 17 and 19 and for recording and erasing information thereon. A screen 37 located above the projection machine 21 provides for visual viewing of the motion picture. Suitable means not here shown are provided for indexing the film strip 11 laterally when bent into the form of an endless belt. This is indicated diagrammatically by arrow 39. Image rays from the film gate 29 for example pass through a right angle prism 41 and are deflected by a pair of mirrors 43 and 45 toward the viewing screen 37. Of course, one mirror 43 can be pivoted to allow the image rays to focus upon a wall screen, not here shown.

The project or machine 21 is designed to move the endless film strip 11 continuously past the sound gate 31 while moving intermittently frame-by-frame past the film gate 29. More detailed features of the projector needed to accomplish this are shown in FIGS. 5 to 8. Central drive shaft 47 provides the power and runs the entire length of the machine. Intermediate gears 49 mesh with the drive shaft 47 and transmit power to the drive sprockets 23 which engage the sprocket holes 13 in the film strip 11. When introduced into the projector, the film strip 11 moves continuously as an endless belt between each of the drive sprockets 23 and its associated idler roller 25. Since the sound gate 31 lies between the two drive sprockets 23, it is seen that there is continuous movement of the film unit 11 past the sound gate. Intermittent driving of the film past the projection lens at the film gate is provided for instance by a four-lobed Geneva mechanism 51 which stops four times for every revolution and is driven by operating cam gear 53 engaged with drive shaft 47. The Geneva mechanism 51 is connected to a film pull-down 54.

The film guide 27 includes two stationary spaced front plates 55 and 57 between which the endless belt film unit 11 passes. The various picture frames 15 of the film unit pass in front of aligned apertures 59 in the plates 55 and 57. A conventional shutter not here shown is associated with the apertures 59. Several pairs of flexible spring fingers 61 and 63 are located at the top and bottom of the front plates 55 and 57 and have a storage and take-up function for the endless belt film unit as it moves continuously past the idler rollers 25 while having intermittent motion at the film gate 29. Each pair of the spring fingers has a lost motion connection 65 with the front plates 55 and 57 and are fixed at the other end in the vicinity of the idler rollers 25. The film moves between the pairs of spring fingers which operate approximately as shown in FIG. 8. Immediately after the film pull-down device operated by Geneva mechanism 51 has pulled down the film unit, there is an excess of film below the film gate as shown in FIG. 8a which causes the film to bulge out and to extend the lost motion connection 65. At the same time the upper portion of the film is at its least length and the ends of the spring fingers move as far toward the front plates 55 and 57 as the lost motion connection allows. FIG. 8b shows the position of the spring fingers at the instant before pulling this same frame down. The upper spring fingers have now bulged out by extending the lost motion connection to accommodate the extra portion of film delivered from the idlers 25, while the lower loop of film below the front plates 55 and 57 is at its least length due to the take-up by the opposing idler 25. In addition to facilitating intermittent movement of the endless belt film unit 11 past the film gate 29 while moving continuously past the sound gate 31, the flexible spring fingers 61 and 63 are designed so that positive pressure is always maintained between the trailing edge and the leading edge of the film unit 11 while yet allowing this intermittent film motion.

The film strip 11 can be inserted into the projector machine and ejected therefrom by means of a simple lever-operated device 67. Moving the lever to the full line positions runs the film as a belt, while moving it back to dotted line position causes the film to be ejected. Other features of the projector machine 21 are not here shown. Suitable mechanisms and controls can be provided for indexing the film unit 11 laterally by one channel at a time in sequence or in whatever sequence is directed by the operator. Controls can also be provided for stopping the film at any particular picture frame of one of its channels.

The motion picture film 11 having the format according to the invention has a number of advantages over more conventional cartridge type film, which has only one channel of frames and only one recording track. An important advantage is the random access feature due to the parallel-serial arrangement of the picture frames. The film 11 can be shown straight through or a selected portion can be viewed once or repetitively, if desired. The film additionally can be stored flat and can be used in a projector as an endless belt without the need for fasteners or devices to hold the ends together. Sound continuity is obtained by providing the magnetic (or optical) recording tracks with crossover portions on at least one portion of the film in an area used for indexing the film which therefore does not contain picture frames. The use of two magnetic tracks or one optical and one magnetic track is possible and has a particular advantage for instructional film where one track contains pre-recorded information and the other is a student record-erase track. The film format has other uses such as the basic storage unit of an information storage and retrieval system. The flat format permits lower master print production costs and can be easily reproduced in its entirety or only a portion by standard techniques used for flat sheets.

While the invention has been particularly shown and described with reference to preferred embodiments thereof, it will be understood by those skilled in the art that the foregoing and other changes in form and details may be made therein without departing from the spirit and scope of the invention.

What is claimed is:

A random access motion picture film adapted to be filed flat and run in a projector as an endless belt, said film comprising
- a plurality of equal-sized picture frames arranged in parallel channels and rows, and
- at least two recording tracks extending parallel to each of the channels of picture frames and associated therewith,
- one of the recording tracks containing pre-recorded information while the other is a magnetic record-erase track, said recording tracks having diagonal cross-over portions connecting the tracks associated with a row of picture frames with the tracks associated with the next parallel row of picture frames to provide continuity between the tracks associated with adjacent parallel channels.

References Cited

UNITED STATES PATENTS

| | | | |
|---|---|---|---|
| 1,557,727 | 10/1925 | Reynolds | 352—101 X |
| 2,628,288 | 2/1953 | Blaney | 352—270 X |
| 2,931,571 | 4/1960 | Trimble | 274—41.40 X |

FOREIGN PATENTS

| | | |
|---|---|---|
| 1,236,802 | 6/1960 | France. |

JULIA E. COINER, *Primary Examiner.*